Feb. 23, 1960  K. E. SNYDER  2,925,897
TORQUE TRANSMITTING DEVICE
Filed Feb. 5, 1957

INVENTOR.
KENNETH E. SNYDER
BY
ATTORNEY

United States Patent Office 2,925,897
Patented Feb. 23, 1960

2,925,897
TORQUE TRANSMITTING DEVICE

Kenneth E. Snyder, Northville, Mich., assignor to General Motors Corporation, Detroit, Mich., a corporation of Delaware Application February 5, 1957, Serial No. 638,388

5 Claims. (Cl. 192—69)

This invention relates to a torque transmitting device and is particularly concerned with a clutch plate and clutch plate assembly which eliminates chattering and noise during engagement thereof.

It is the main object of the invention to provide a plate for use in a torque transmitting device of the multiple-disc type wherein the plate is provided with driving lugs or tongues that are deflectable whereby the plate, when transmitting torque, can rotate slightly in its mounting due to the deflection of the lugs for breaking up the frequency of vibration thereof, thereby eliminating noise and chatter.

Another object of the invention is to provide a clutch plate for use in a multiple plate assembly that is provided with at least three equally spaced driving means at the exterior surface thereof, each of said driving means consisting of a pair of spaced tongues extending outwardly from the plate and joined to the plate at their roots on a circumference having a radius equal to the radius of the plate less one-half the length of the tongue.

Another object of the invention is to provide a clutch assembly including a driving element having keyways therein and a clutch plate carried by said keyways through keys wherein the keys on the clutch plate have clearance with the keyways and wherein the keys each consist of a pair of deflectable tongues which permit slight angular movement of the plate upon engagement thereof for reducing noise and eliminating chattering during the operation of the clutch.

Further objects and advantages of the present invention will be apparent from the following description, reference being had to the accompanying drawings wherein a preferred embodiment of the present invention is clearly shown.

Figures 3, 4:
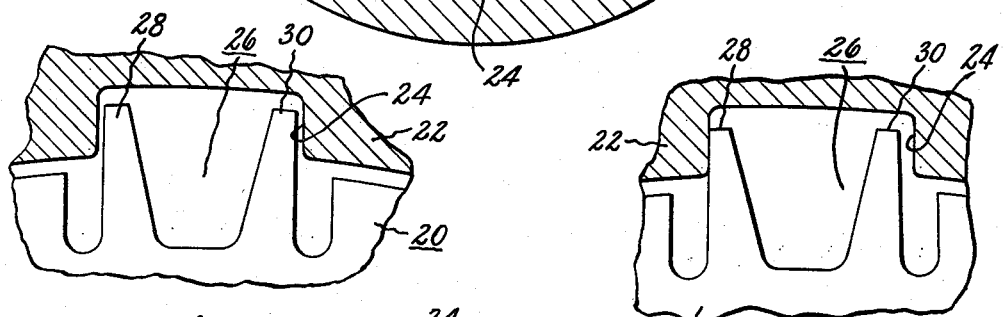
Figures 5, 6:
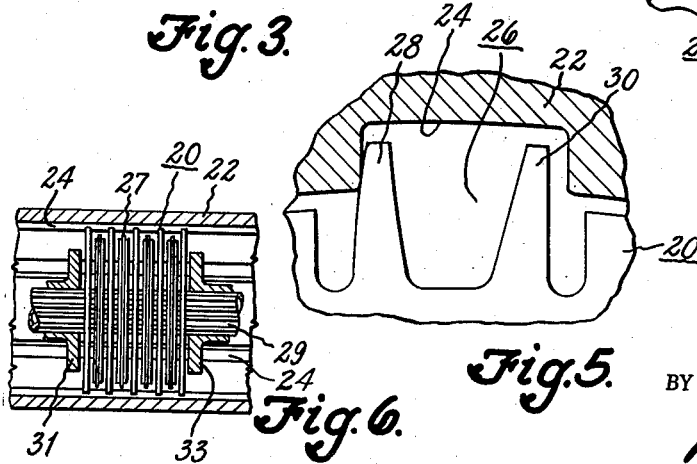

Figures 3 to 5 inclusive, are progressive fragmentary views on an enlarged scale showing one of the keys in engagement with the casing keyway wherein the clutch is out of engagement in Figure 3, initially engaged in Figure 4, and is fully engaged in Figure 5.

Figure 6 is a diagrammatic view of a conventional multiple plate clutch assembly as herein described.

Automatic transmissions and the like utilize multiple plate clutch assemblies for torque transmitting purposes. These assemblies generally include two sets of plates conventionally termed driving and driven plates wherein the plates are alternately positioned and are alternately keyed to an external and an internal member, which members are rotatable relative to one another. Pressure plates or devices, applied at opposite ends of the pack, act to squeeze the plates into engagement with one another when it is desired to transmit torque from one set of plates to the other set whereby all plates rotate as a unit.

Devices of this character are fully described in application S. N. 579,331, assigned to the assignee of the present invention, in Almen and Carnegie Patent 2,733,-797 and in Thompson Patent 2,193,524. In each case, a clutch assembly or pack is shown wherein keys or splines are provided at the outer periphery of one set of plates and at the inner periphery of the other set of plates which splines engage keyways in associated members for driving the plates therewith. This particular phase of the structure forms no part of the invention here which is directed to a specific construction of the keys or splines to obtain a desired result.

In many clutch packs of the nature described, there is a tendency, during engagement of the pack, towards chattering or noise. This is caused by vibration of the several plates which often continues until full engagement is obtained. I have found that if one set of plates in this type of assembly can be progressively shifted a very slight amount radially, during engagement and up to full engagement, the frequency of the vibration can be thrown out of phase so that noise is eliminated.

A diagrammatic view of a clutch pack assembly is shown in Figure 6 wherein the casing is shown at 22 and includes interiorly extending keyways therearound which carries a plurality of plates 20 keyed thereto by keys 26. Alternated between the plates 20 are plates 27 which are keyed to a central shaft or tube 29 that includes axially extending splines thereon. Acting around the tube at opposite ends thereof are two plates 31 and 33 which may be termed pressure plates or pressure members which are actuated by conventional hydraulic means for causing the members 31 and 33 to move toward one another when it is desired to engage the clutch. This movement progressively forces the plates 20 and 27 into engagement with one another so that the plates turn as a unit. This will cause the shaft 29 and the casing 22 to turn as a unit. In this instance, it is apparent that either the casing or the shaft 29 may be the driving member while the other is the driven member. It is also apparent as described in the aforementioned application and patents that one or the other set of plates may be faced, waved, etc., as is desired and it is understood that this is fully within the scope of my invention.

Figures 1, 2:
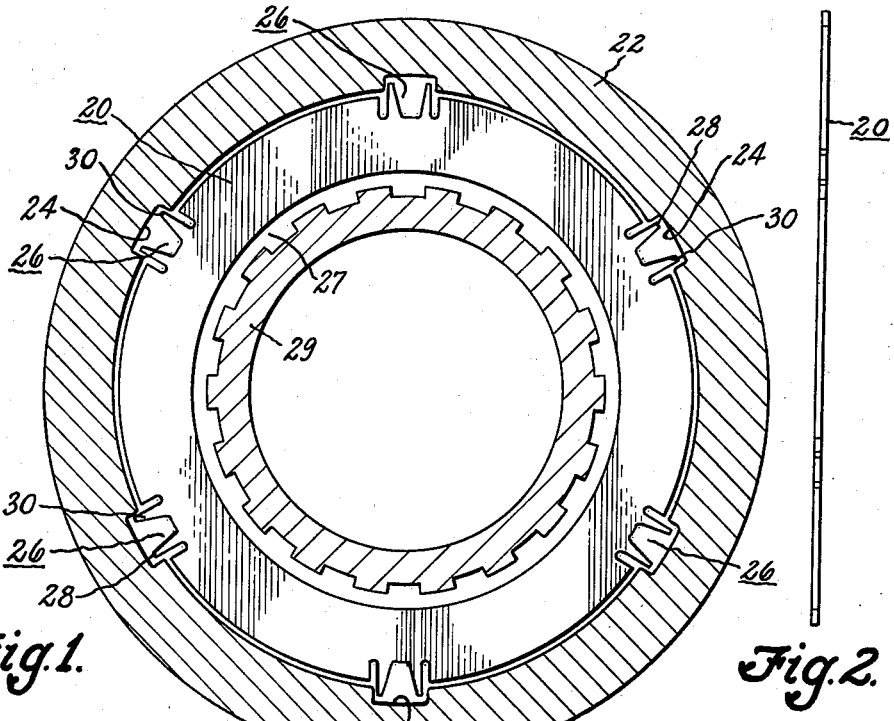
Figure 1 is a sectional view through the casing of a torque transmitting device showing one of the clutch plates in position.
Figure 2 is a side view of the clutch plate shown in Figure 1.

My improved clutch plate is shown at 20 in Figure 1 wherein the plate 20 is carried by a casing 22 which includes a plurality of interiorly disposed, axially extending keyways 24 which are equally spaced around the inner periphery of the casing. The plate 20 includes a plurality of radially extending keys 26 equal in number to the keyways 24. Each key 26 consists of two opposed tongues 28 and 30. The tongues 28 and 30 simulate small cantilever beams and are capable of deflection as will be described hereinafter. The keys 26 have a radial dimension which is slightly less than the dimension of the keyways 24 and, generally speaking, a clearance of .015 to 0.20 is sufficient. Thus, the clutch plate 20, when no torque load is applied thereto, actually floats in the casing 22 due to the clearance between the radial dimension of the keys and the radial dimension of the keyways.

Figure 3 is an enlarged view showing this condition wherein the two tongues 28 and 30 are shown out of contact with the wall of the keyway 24. Of course, this is an exaggerated condition since one or more of the tongues will generally be in floating abutment with one of the walls of the keyway even when no load is applied. As the clutch pack commences to engage, and the plates come into initial torque transmitting relation with one another, the plate 20 will shift so that the tongue 28 comes into firm contact with the wall of the slot 24, as noted in Figure 4. As the torque load increases and, at a point where chattering and vibration normally begin to occur, the tongue 28 will deflect slightly, as shown in Figure 5, to change the frequency of vibration of the associated plate and thereby eliminate chattering. If the rotation is in the opposite direction, the other tongue 30 will be engaged in a like manner and the reverse cycle of conditions will be present.

It will be noted that the tongues 28 and 30, forming the keys 26, each have their roots spaced inwardly from the outer diameter of the plate and, while the tongues extend outwardly from the plate, their roots are actually joined to the plate on a circumference having a radius substantially equal to the radius of the plate less one-half the length of the tongue. This makes the tongues of sufficient length relative to their width to permit deflectability of the tongue without excessive clearance between the plate and the casing.

In general, for a plate having an outer diameter in the order of 6.80 inches, the tongues are about three-eighths of an inch long with three-sixteenths of an inch thereof protruding past the main diameter of the plate. The tongues have straight outer edges of radial extent and taper inwardly at their opposed inner edges for each pair thereof. The upper end of each tongue is about .007 of an inch while the root of the tongue is about twice this dimension or .015 of an inch. The outside spacing of the straight edges of the tongue is in the order of .490 inches while the keyways, as previously stated, are between .010 and .015 of an inch greater in cross dimension. In general, the engaging portion of the tongue which actually abuts the keyway is about one-third of its length since the tongue does not fit fully within the keyway as noted on the drawing.

It is understood that the dimensions given are exemplary of one useful form of clutch plate and that the dimensions are not critical so long as the driving tongues of the keys are deflectable in the ultimate installation so as to permit slight radial movement of the plate to break up the vibration thereof.

It is desirable to have the outside surfaces of the tongues substantially parallel or at least on radii of the discs and to have a taper at the internal opposed surfaces thereof to strengthen the tongues and to improve their deflectability. Otherwise, the specific shape thereof is of no particular importance so long as they will function as set forth.

Stated broadly, the invention here is directed to a clutch plate and clutch plate assembly wherein the plates are carried by a member through keys loosely engaging keyways in the member so that the plate may be said to float with respect to the member, the keys consisting of opposed and spaced cantilever beams which, upon engagement of the plate, are shifted so that one of the beams of each key is in engagement with the keyway and is deflectable upon increasing torque load applied thereto to change the frequency of vibration of the plate for eliminating chatter.

While the embodiment of the present invention as herein disclosed, constitutes a preferred form, it is to be understood that other forms might be adopted.

What is claimed is as follows:

1. A clutch plate for use in a multiple plate assembly comprising an annular plate having at least three equally spaced outwardly facing channel-form recesses in the periphery of said plate, the peripheral edge of said plate between said recesses constituting arcs of a circle, and a driving means corresponding to each of said recesses, each of said driving means consisting of a pair of spaced circumferentially deflectable tongues of substantially the same size extending outwardly past the outer periphery of the plate and joined to the plate at their roots on the bottom of the corresponding recess and being spaced from the side walls of said recess.

2. A clutch plate as defined in claim 1 wherein said recesses have a depth equal to about one half the length of a tongue.

3. In a multiple plate clutch assembly including concentric driving and driven elements, a plurality of clutch plates connected to each of said elements wherein one of said elements is connected to each of its cooperating clutch plates by a series of keyway and key arrangements formed therein, the periphery of each of the clutch plates between said keys constituting arcs of a circle, each of said keys consisting of a pair of circumferentially deflectable tongues of the same size, which tongues project from the periphery of the clutch plate, said plate having slots formed inwardly along each side of the key, and between said tongues, to effectively increase the length and deflectability of the tongues.

4. A multiple plate clutch assembly as defined in claim 3 wherein the slots extend inwardly from the outer circumference of the plate substantially the same distance that the tongues project outwardly beyond said circumference.

5. In a multiple plate clutch assembly, the combination comprising: concentric driving and driven elements, a plurality of clutch plates connected to each of said elements, said connection comprising a key and keyway arrangement formed in one of the said elements and in each of the cooperating clutch plates wherein each of said keys has radial clearance with its respective keyway, said clutch plates having channel shaped recesses in the periphery thereof opposite the keyways in the said element and facing said keyways, the peripheral edge of the plate between recesses constituting arcs of a circle, each of the said keys consisting of a pair of spaced deflectable tongue elements of substantially the same width extending from one of said recesses wherein the spacing between the tongue elements is greater than the width of one of said tongue elements and wherein each element is tapered outwardly from its junction with the plate, said tongue elements being joined with the plate on the bottom of said recess and spaced from the sides of the recess, said recess having a depth equal to one-half the length of a tongue element, whereby the plate upon engagement may rotate slightly relative to the keyway carrying element due to slight circumferential deflection of the tongue elements for reducing noise and eliminating chatter in the clutch.

References Cited in the file of this patent

UNITED STATES PATENTS

| | | |
|---|---|---|
| 1,340,885 | Fuller | May 25, 1920 |
| 1,467,732 | Litle | Sept. 11, 1923 |
| 2,053,849 | Spase | Sept. 8, 1936 |
| 2,738,864 | Becker | Mar. 20, 1956 |